United States Patent
Cordero et al.

(10) Patent No.: US 6,526,967 B2
(45) Date of Patent: Mar. 4, 2003

(54) CREW OXYGEN MASK STOWAGE ASSEMBLY INCLUDING SELECTIVE DEPRESSURIZATION VALVE

(75) Inventors: Enrique A. Cordero, Overland Park, KS (US); James P. Morris, Kansas City, MO (US); Kirsten S. Frogley, Shawnee, KS (US); Thomas K. McDonald, Overland Park, KS (US)

(73) Assignee: BE Intellectual Property, Inc., Wellington, FL (US)

( * ) Notice: Subject to any disclaimer, the term of this patent is extended or adjusted under 35 U.S.C. 154(b) by 0 days.

(21) Appl. No.: 10/043,567

(22) Filed: Jan. 10, 2002

(65) Prior Publication Data

US 2002/0189617 A1 Dec. 19, 2002

Related U.S. Application Data

(60) Provisional application No. 60/297,395, filed on Jun. 11, 2001.

(51) Int. Cl.$^7$ ................................................ A62B 9/00
(52) U.S. Cl. ........................ 128/200.24; 128/205.24; 128/205.25; 128/206.27; 128/207.12
(58) Field of Search ................. 128/204.18, 205.24, 128/205.25, 207.18, 206.21, 206.24, 206.26, 206.27, 200.24, 207.12, 207.16, 202.11, 898

(56) References Cited

U.S. PATENT DOCUMENTS 3,981,302 A * 9/1976 Veit ...................... 128/206.27
5,954,052 A * 9/1999 McDonald et al. .... 128/206.27

FOREIGN PATENT DOCUMENTS

WO        90/02582    * 3/1990    ............ 128/206.27

* cited by examiner

Primary Examiner—Glenn K. Dawson
(74) Attorney, Agent, or Firm—Hovey Williams LLP

(57) ABSTRACT

An improved crew oxygen mask and stowage assembly combination (10) is provided including a stowage box (12) equipped with a door (22), with a crew mask assembly (14) made up of a mask (48), gas-conveying tubing (50) and valve unit (46). The box (12) also includes a valve-controlling switch lever (44) for selective gas-on or gas-off operation of valve unit (46). In normal conditions, the mask (48) and tubing (50) are stowed within box (12) with lever (44) oriented in the gas-on position, so that the tubing (50) is pressurized and mask (48) may be quickly pulled from the box (12) and used. After such use, the switch lever (44) is shifted to the gas-off position, causing the tubing (50) to be depressurized; this allows easy restowage of the tubing (50) and mask (48) within the box (12). However, when door (22) is closed, the switch lever (44) is cammed back to the gas-on position, thereby repressurizing tubing (50) and returning the combination (10) to a full-ready condition.

10 Claims, 4 Drawing Sheets

CREW OXYGEN MASK STOWAGE ASSEMBLY INCLUDING SELECTIVE DEPRESSURIZATION VALVE

RELATED APPLICATIONS

This application claims the benefit of Provisional Application No. 60/297,395, filed Jun. 11, 2001; the entire contents of this provisional application are incorporated by reference herein.

BACKGROUND OF THE INVENTION

1. Field of the Invention

The present invention is broadly concerned with improved crew mask and stowage assembly combinations broadly including a stowage box and a crew mask assembly which are designed for ease of the crew mask deployment and use, while also permitting rapid and easy restowage of the mask. More particularly, the invention is concerned with such combinations, as well as stowage assemblies and methods of operation, wherein a shut-off member is operably associated with the crew mask assembly for selective depressurization of mask supply tubing during restowage; when the mask and tubing are restowed, closure of the stowage box door serves to automatically repressurize the mask tubing so that the mask is again ready for use.

2. Description of the Prior Art

Commercial aircraft crew cabins are universally supplied with emergency oxygen systems. Typically, at each crew member station a stowage box is provided which houses a donnable mask and a length of gas-conveying tubing. In the ready condition, the tubing is pressurized so that breathable gas will be immediately delivered to the crew member when the mask is deployed. In an emergency situation, the crew member grasps a protruding portion of the mask and pulls it, along with the tubing, from the confines of the stowage box. Pressurized breathable gas is delivered through the tubing to the crew member once the mask is properly donned.

After use of a crew mask in an emergency situation or after testing, the mask and tubing must be properly restowed within the box in a ready configuration. However, a problem arises during restowing owing to the fact that the elongated tubing remains fully pressurized. That is, crew members often find it difficult to properly coil the tubing in a desirable neat way within the housing, because of the fact that the pressurized tubing is difficult to manipulate. Consequently, either considerable time and effort is required to properly restow the mask assembly, or the crew member simply "stuffs" the tubing into the box without regard to properly coiling the tubing. The latter alternative is very undesirable, given that the tubing may tangle during the next mask deployment.

There is accordingly a need in the art for an improved apparatus and method permitting rapid and easy restowage of crew mask equipment while at the same time ensuring that the equipment is in a full ready condition once restowed.

SUMMARY OF THE INVENTION

The present invention overcomes the problems outlined above and provides an improved crew mask and stowage assembly combination broadly including a stowage box presenting an open end and having a door adjacent the open end which is movable between a closed, mask stowage position and a open, mask deployment position. The overall combination further includes a crew mask assembly comprising a donnable crew mask, a length of breathable gas-conveying tubing coupled with the mask, and a valve unit operably connected with the tubing for delivery of pressurized breathable gas to the tubing to thereby pressurize the latter. The mask and tubing are normally located within the box and are removable therefrom for deployment and use when the box door is in its open position. Moreover, the mask and tubing are replaceable in the box through the box open end, whereupon the door is returned to its closed position. A shut-off member is operably associated with the crew mask assembly to selectively depressurize the tubing in order to facilitate restowage of the mask and tubing into the box. However, the door and crew mask assembly are cooperatively configured for repressurization of the tubing in response to movement of the door to its closed position. Thus, in preferred forms, a user may depressurize the mask tubing by manipulation of the shut-off member to a gas-off position, so that the tubing and mask can be easily restowed; thereafter, when the box door is closed, the shut-off member is shifted back to a gas-on position to effect repressurization of the mask tubing.

In preferred forms, the valve unit is secured within the box and includes a shiftable control plunger. The shut-off member is in the form of a shiftable switch lever engageable with the plunger and having a camming surface. The box door carries a complemental camming member so that, during door closure, the switch lever is cammed to the gas-on position.

DETAILED DESCRIPTION OF THE PREFERRED EMBODIMENT

Turning now to the drawings, a crew mask and stowage assembly combination 10 is illustrated which broadly includes a stowage box 12 and an associated crew mask assembly 14. The assembly 14 is normally housed within box 12, but can be readily pulled from the box by a crew member in an emergency situation to deploy the mask and provide supplemental breathable gas. The overall combination 10 is also designed so that the assembly 14 may readily restowed within the box 12 after such use.

Figure 1:
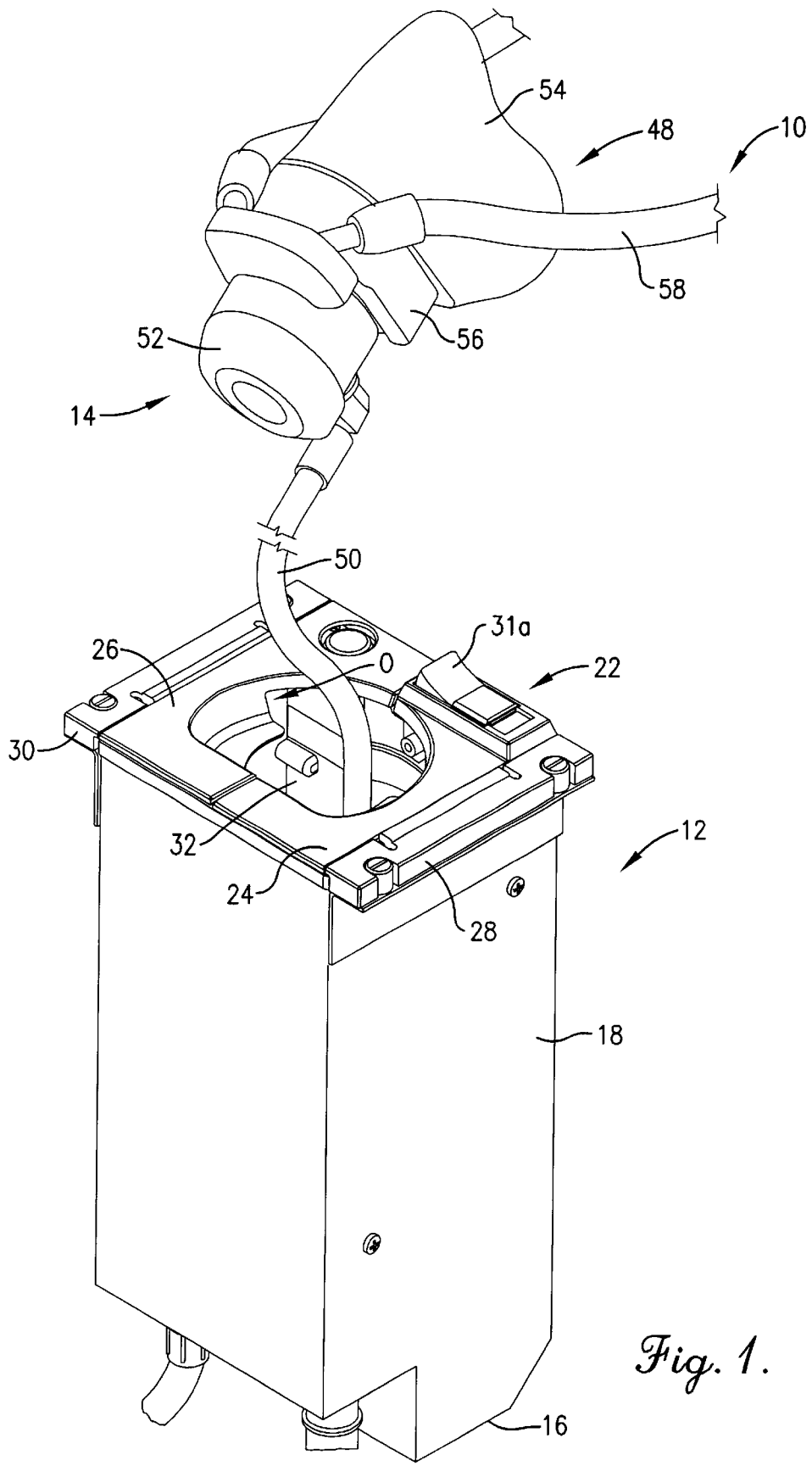
FIG. 1 is a perspective view illustrating a stowage mask assembly in accordance with the invention, shown with a crew mask deployed from the stowage box.

The box 12 is basically of upright open-top hollow configuration and has stepped bottom wall 16, circumscribing sidewalls 18 and an open top 20. A door 22 is hingedly secured to the upper margin of sidewalls 18; in the illustrated form, the door 22 is made up of half-door sections 24 and 26 which are hingedly connected to the upper ends of opposed sidewalls 18 by means of elongated mounts 28 and 30. The section 24 includes a mask-engaging shelf component 31 external test button 31*a* and a lower camming component 31*b*. As best seen in FIG. 1, when the door sections are closed, they cooperatively define a mask-receiving opening O.

The box 12 is also equipped with a ramp plate 32 situated adjacent the top of the box near open end 20. The plate 32 includes an top wall 34 having recesses 36 and 38 formed therein, as well as a depending wall 40 terminating in an angularly oriented guide plate 42. The plate 32 supports a switch lever 44 described hereinafter as well as a valve unit 46 forming a part of mask assembly 14. The box 12 is sized to receive all of the components of the mask assembly 14, for ease of deployment and restowage thereof. Although not illustrated, the box 12 may also have an internal soft fabric or synthetic resin open-top bag secured to the upper end of plate 32 and the remainder of sidewalls 18 for receipt of the mask assembly; in such a case, the bag may be supported by complemental hook-and-loop fabric (Velcro®) affixed to the outer surface of the bag and the adjacent box surfaces.

The crew mask assembly 14 includes a conventional crew mask 48, a length of elongated breathable gas-conveying tubing 50 operatively coupled with mask 48, and valve unit 46. The mask 48 would typically include regulator 52, flexible nose and mouth piece 54, control levers 56 and pneumatic harness components. It is particularly preferred that the mask 48 be of the type which is fast-donning, having expandable harness components 58 which, upon pressurization and inflation thereof, assume an enlarged or extended configuration allowing rapid donning of the mask; once donned, the pressure within the components 58 is relieved, thereby causing the latter to contract and come into close-fitting relationship to the wearer's head. Such masks are illustrated in U.S. Pat. Nos. 4,915,106 and 3,599,636, incorporated by reference herein. It will also be appreciated that while a nose and mouth mask 48 is depicted, other types of masks such as full-face masks could also be employed.

Figure 3:
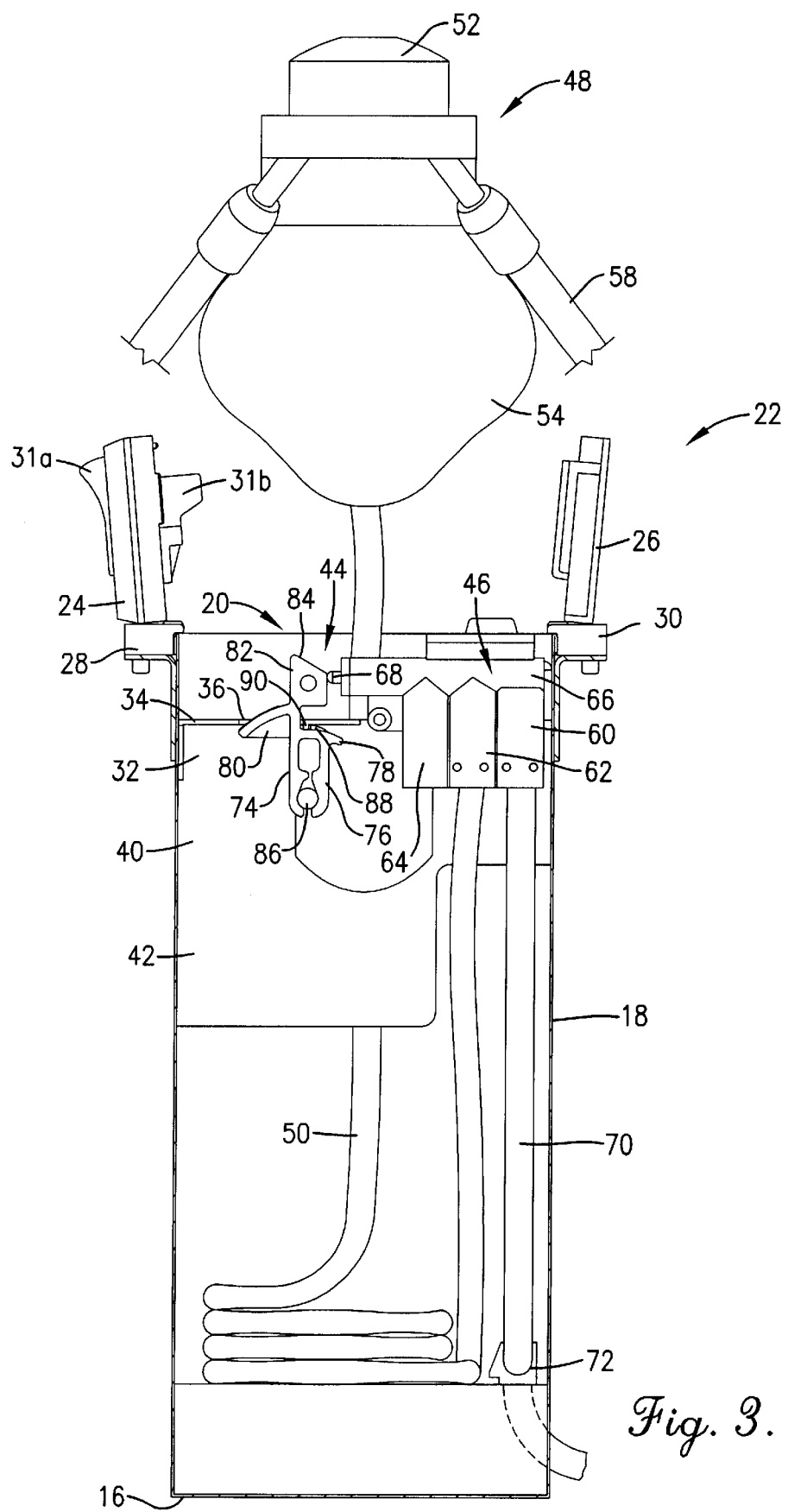
FIG. 3 is a vertical sectional view depicting the internal construction of the stowage box with the box doors open and the crew mask deployed, and the oxygen shut-off lever in the oxygen-off position engaging the valve unit plunger.
Figure 5:
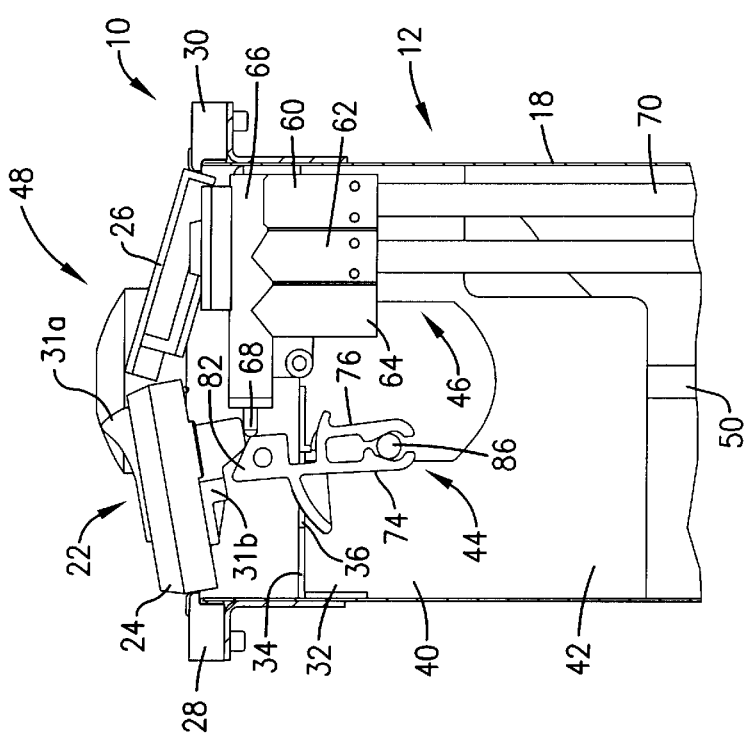
FIG. 5 is a vertical sectional view of the mask stowage assembly with the mask within the stowage box and the oxygen shut-off lever fully shifted to the oxygen-on position.

The tubing 50 is extends from regulator 52 downwardly through the open top 20 of box 12 and has a length sufficient for full deployment and use of the mask as illustrated in FIGS. 3 and 5, the tubing 50 is conventionally coiled within the bottom of box 12.

The valve unit 46 includes a pressurized gas inlet 60, a pressurized gas outlet 62 and a control block 64. In addition, the valve unit has an elongated, generally horizontally extending plunger chamber 66. A shiftable control plunger 68 is located within chamber 66 and serves as an on/off control for the valve 46. Referring to FIGS. 3 and 5, it will be observed that the end of tubing 50 remote from mask 48 is operatively connected with outlet 62. On the other hand, a gas supply tube 70 is coupled to inlet 60 and extends downwardly for passage out of box 12 through opening 72. The supply tube 70 is in turn connected with a source of breathable gas provided with the aircraft. The overall operation of the valve unit 46 involves delivery of pressurized breathable gas to tubing 50 when plunger 68 is fully extended (FIG. 5), and cessation of gas delivery and depressurization of tubing 50 when the plunger is depressed (FIG. 3).

The switch lever 44 is located adjacent plunger 68 and includes an elongated, upright lever body 74 having a bifurcated lower connection section 76, a pair of opposed, oppositely extending, arcuate segments 78 and 80 above section 76, and an uppermost plunger-engaging head 82 having an oblique camming surface 84. As illustrated, the legs of bifurcated section 76 engage a laterally extending stud 86 forming a part of plate 32, thereby permitting the lever to pivot about the axis of the stud. As depicted in FIG. 3, the segment 78 is equipped with an upstanding latch 88 which cooperates with a depending latch finger 90 provided at the margin of recess 36.

In use, the mask assembly 14 is normally housed within box 12 with the door sections 24, 26, closed so that the forward portion of the mask protrudes through opening O. In such orientation, the plunger 68 is extended so that the tubing 50 remains pressurized. In the event of a crew cabin emergency (or for periodic testing) the crew member grasps the protruding end of mask 48 and pulls the mask from the box 12. This causes the door halves to flip open as shown in FIG. 3, so that the mask and tubing can be easily deployed. During this sequence, the control levers 56 are also depressed, which serves to pressurize and expand the harness components 58; accordingly, the crew member can very rapidly don the mask, all within the requisite 5 seconds mandated by governmental regulations. Thereupon, the levers 56 are released, and the components 58 retract to hold the mask 48 in place. As the mask is being worn, breathable gas is delivered through the tube 50 and regulator 52 into the nose and mouthpiece 54.

Figure 2:
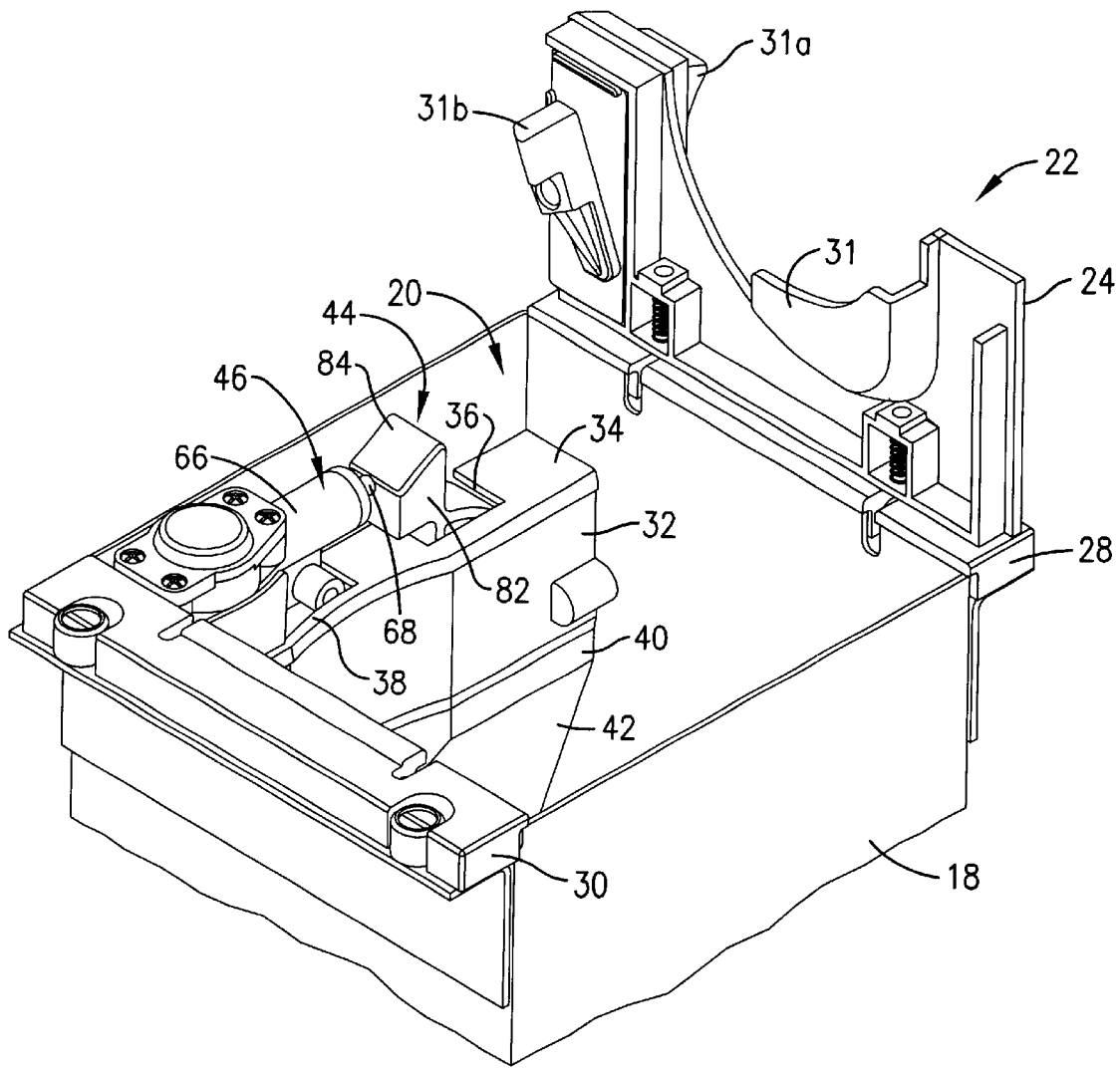
FIG. 2 is a fragmentary perspective view illustrating details of the preferred stowage box.
Figure 4:
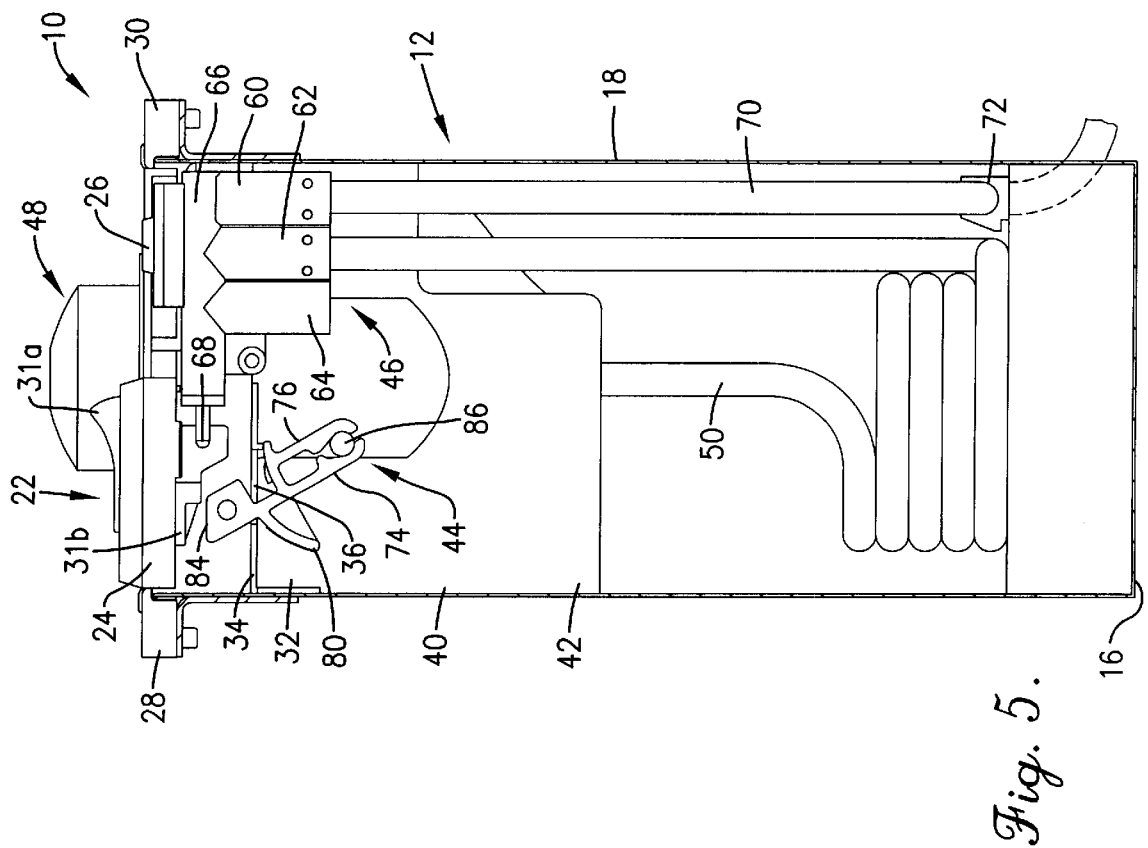
FIG. 4 is a fragmentary vertical sectional view illustrating the mask fully within the stowage box and during closure of the stowage box door to initiate shifting of the oxygen shut-off lever to the oxygen-on position.

After use of the mask, it is necessary to restow the assembly 14 to its ready position. This involves initially shifting the switch lever 44 from its gas-on position in FIG. 5 to the gas-off position shown in FIGS. 2 and 3. This can be readily accomplished by a simple, manual "flip" of the lever in a clockwise direction as viewed in FIGS. 2 and 3 until the latch component 88 comes into locking engagement with latch finger 90. This causes head 82 to engage plunger 68 to move it rightwardly to the gas-off position. When this occurs, the valve unit 46 actuates to terminate flow of pressurized gas to the tubing 50, and to drain and depressurize the latter. When depressurized, the tubing 50 can be readily coiled within box 12 without the undue stiffness encountered when attempted to stow pressurized tubing. When the tubing is thus restowed the mask 48 is moved downwardly to a level slightly below the door sections 24, 26, whereupon the latter are closed. Closing of door section 24 (FIG. 4) causes camming component 31*b* to come into engagement with surface 84 of lever head 82, which in turn cams the lever in a counterclockwise direction as viewed in FIGS. 4 and 5 until the lever is in its gas-on position with plunger 68 fully extended. It will be appreciated that closure of the door half 24 automatically shifts the switch lever 44 in this fashion, so that the tubing 50 is automatically repressurized. In this way, the overall combination 10 is again ready for deployment and use.

We claim:

1. A crew mask and stowage assembly combination comprising:

a stowage box presenting an open end and having a door adjacent said open end, said door moveable between a closed, mask stowage position and an open, mask deployment position;

a crew mask assembly including a crew mask, a length of breathable gas conveying tubing coupled with the mask, and a valve unit operably connected with the tubing for delivery of pressurized breathable gas to the tubing to thereby pressurize the tubing, said mask and tubing located within said box and removable therefrom for deployment and use when said door is in said open position, said mask and tubing being replaceable in said box through said open end after said deployment and use, with said door returned to said closed position thereof; and a shut-off member operably associated with said crew mask assembly to selectively depressurize said tubing in order to facilitate said replacement of said mask and tubing in said box, said door and crew mask assembly being cooperatively configured for repressurization of said tubing in response to said return of the door to said closed position thereof.

2. The combination of claim 1, said door having a pair of door sections each hingedly coupled to said box and, when the door is closed, cooperatively defining an opening permitting a portion of said mask to protrude from the box.

3. The combination of claim 1, said valve unit fixedly secured within said box.

4. The combination of claim 1, said shut-off member comprising an element adjacent said valve unit and shiftable between a gas-on position for pressurization of said tubing, and a gas-off position for depressurization of the tubing.

5. The combination of claim 4, said valve unit including a shiftable plunger, said element comprising a lever engagable with said plunger, said lever and plunger configured such that when the lever is shifted to engage the plunger said tubing is depressurized, and when the lever shifted out of engagement with the plunger said tubing is pressurized.

6. The combination of claim 4, said door including an element-engaging body which engages said element when said door is returned to said closed position thereof and thereby shifts the element to said gas-on position.

7. A stowage assembly adapted to receive a crew mask assembly including a crew mask, a length of breathable gas-conveying tubing coupled with the mask, and a valve unit operably connected with the tubing for delivery of pressurized breathable gas to the tubing to thereby pressurize the tubing, said stowage assembly comprising:

a stowage box presenting an open end and having a door adjacent said open end, said door moveable between a closed, mask stowage position and an open, mask deployment position, said box configured to receive said mask and tubing, wherein said mask and tubing being removable from the box for deployment and use when said door is in said open position, said mask and tubing being replaceable in said box through said open end after said deployment and use, with said door returned to said closed position thereof; and a shut-off member configured to be operably associated with said crew mask assembly to selectively depressurize said tubing in order to facilitate said replacement of said mask and tubing in said box, said door configured to operatively engage said crew mask assembly for repressurization of said tubing in response to said return of the door to said stowage position thereof.

8. The assembly of claim 7, said door having a pair of door sections each hingedly coupled to said box and, when the door is closed, cooperatively defining an opening permitting a portion of said mask to protrude from the box.

9. A method of stowing a crew mask assembly in a stowage box therefor, said crew mask assembly including a crew mask and a length of pressurized breathable gas-conveying tubing coupled with the mask, said stowage box including an open end and having a door adjacent the open end movable between an open and a closed position, said method comprising the steps of:

depressurizing said tubing;

at least partially inserting said depressurized tubing and mask into said stowage box while said door is in said open position; and closing said door and in response thereto automatically repressurizing said tubing.

10. The method of claim 9, said crew mask assembly further including a valve unit located within said box, there being a shut-off member comprising an element adjacent said valve unit and shiftable between a gas-on position for pressurization of said tubing, and a gas-off position for depressurization of the tubing, said door including an element-engaging body which engages said element when said door is returned to said closed position thereof and thereby shifts the element to said gas-on position.

\* \* \* \* \*